No. 883,255. PATENTED MAR. 31, 1908.
W. W. SUTHERLAND.
POWER LEVER.
APPLICATION FILED AUG. 26, 1907.

William W. Sutherland, Inventor

Witnesses

By C. A. Snow & Co., Attorneys

THE NORRIS PETERS CO., WASHINGTON, D. C.

UNITED STATES PATENT OFFICE.

WILLIAM W. SUTHERLAND, OF GRISWOLD, IOWA.

POWER-LEVER.

No. 883,255.     Specification of Letters Patent.     Patented March 31, 1908.

Application filed August 26, 1907. Serial No. 390,215.

*To all whom it may concern:*

Be it known that I, WILLIAM W. SUTHERLAND, a citizen of the United States, residing at Griswold, in the county of Cass and State of Iowa, have invented a new and useful Power-Lever, of which the following is a specification.

This invention relates to means for propelling tricycles and other wheeled vehicles and has for its object to provide a system of levers operatively connected with the driving wheel of the vehicle and actuated by foot pedals for propelling the vehicle.

A still further object of the invention is to generally improve this class of devices so as to increase their utility, durability and efficiency.

Further objects and advantages will appear in the following description, it being understood that various changes in form, proportions and minor details of construction may be resorted to within the scope of the appended claims.

Figure 1:
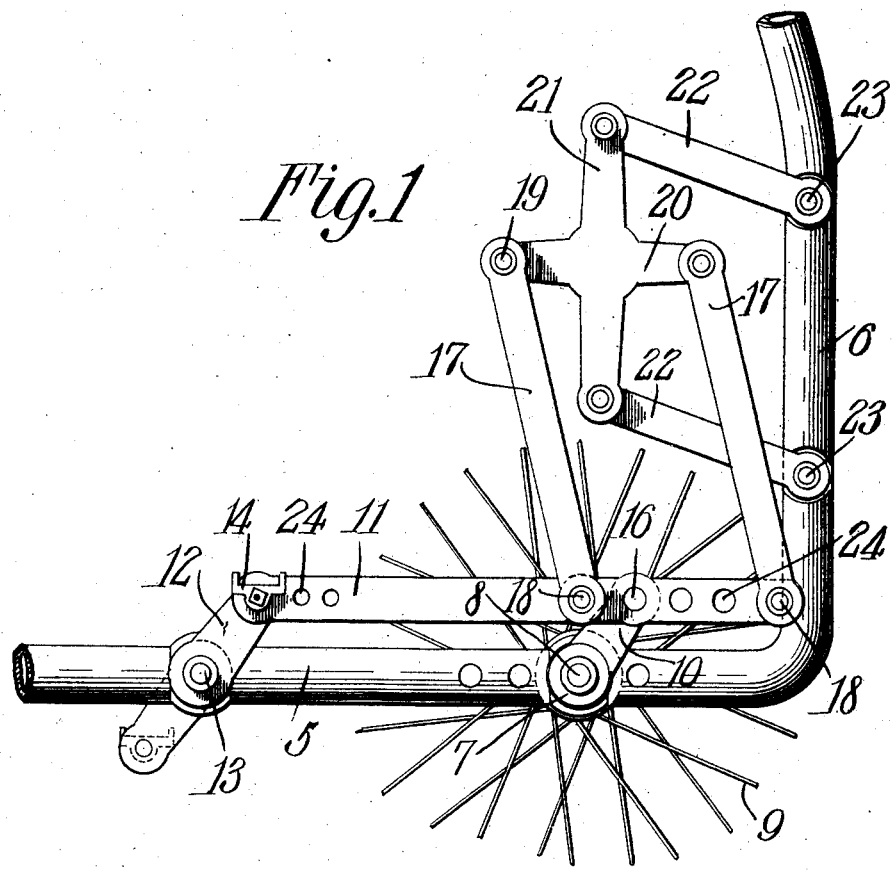
Figure 2:
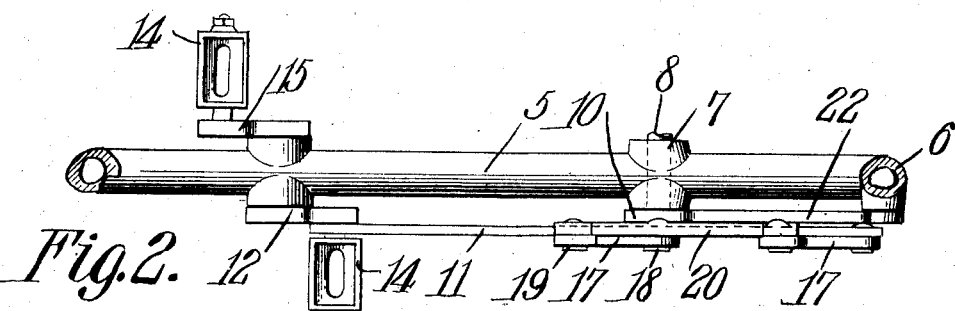

In the accompanying drawings forming a part of this specification: Figure 1 is a side elevation of a portion of the tricycle provided with my improved propelling mechanism. Fig. 2 is a top plan view of the same.

Similar numerals of reference indicate corresponding parts in all of the figures of the drawings.

The improved mechanism forming the subject matter of the present invention is principally designed for use in connection with tricycles and similar wheeled vehicles and by way of illustration is shown applied to a tricycle of the ordinary construction in which 5 designates a portion of the frame provided with a vertical extension 6.

Journaled in suitable bearings 7 in the horizontal bar 5 of the frame is a driving shaft 8 carrying one or more traction wheels 9 of any approved construction.

Secured to one end of the driving shaft 8 is a crank arm 10 connected by a pitman 11 to the crank arm 12 of a pedal shaft 13.

The shaft 13 is journaled in the frame 5 in advance of the driving shaft 8 and is provided with terminal pedals 14 one of which is pivotally mounted on the crank arm 12 while the opposite pedal is pivotally mounted on a crank arm 15 similar in construction to the crank arm 12.

Extending vertically from the pitman 11 on each side of the pivotal connection 16 are spaced levers 17 the lower ends of which are pivotally connected with the pitman at 18, while the opposite ends thereof are pivotally connected at 19 with the horizontal arm 20 of a cross head, as shown.

The vertical arm 21 of the cross head is pivotally connected to the extension 6 of the frame by means of links 22 one end of each of which is secured to the adjacent end of the arm 21 while the opposite ends of the links are pivotally connected at 23 to the vertical extension 6 of the frame so as to permit free movement of the pitman when the pedals are operated.

By arranging the levers in the manner shown, when the crank arm passes the vertical axis of the driving shaft the weight of the levers will force the crank arms downwardly in the arc of the circle and thus assist in rotating the driving wheel. The weight of the levers on the pitman 11 will also have a tendency to normally support the pitman below the horizontal bar 5 of the frame so as to prevent the crank arms from stopping on dead center.

The pitman 11 is provided with one or more openings 24 so that said pitman may be adjusted longitudinally of the frame thereby to vary the throw of the crank arms.

While the propelling mechanism is principally designed for use in connection with tricycles it is obvious that the same may be used with equally good results on hand cars, steam engines, motors or wherever a device of this character is found desirable. It will also be understood that the system of levers may be arranged on one or both sides of the tricycle frame without departing from the spirit of the invention.

Having thus described the invention what is claimed is:

1. The combination with a frame, of a driving shaft provided with a crank arm, a pedal shaft having a similar crank arm, a pitman connecting the crank arms, levers pivotally connected with the pitman on opposite sides of one of the crank arms, and links pivotally connecting the levers with the frame.

2. The combination with a frame, of a driving shaft provided with a crank arm, a pedal shaft having a similar crank arm, a pitman connecting the crank arms, a cross head having intersecting vertical and horizontally disposed arms, levers forming a pivotal connection between the pitman and horizontal arms of the cross head, and links pivotally connecting the opposite ends of the vertical arms of the cross head with the frame.

3. The combination with a frame, of a driving shaft provided with a crank arm, a pedal shaft journaled in advance of the driving shaft and provided with a similar crank arm, a pitman connecting said crank arms and having a series of openings formed therein, a cross head provided with intersecting horizontal and vertical arms, levers forming a pivotal connection between the opposite ends of the horizontal arms of the cross head and the pitman, and links pivotally connected with the opposite ends of the vertical arm of said cross head and pivotally connected with the frame.

4. The combination with a frame, of a driving shaft provided with a crank arm, a pedal shaft journaled in the frame in advance of the driving shaft and provided with oppositely disposed crank arms, pedals pivotally mounted on the crank arms of the pedal shaft, a pitman connecting the crank arm of the driving shaft with one of the crank arms of the pedal shaft, a cross head having intersecting horizontal and vertical arms, levers pivotally connected with the opposite ends of the horizontal arm of the cross head and having their opposite ends pivotally connected with the pitman on each side of the crank arm of the driving shaft, and links forming a pivotal connection between the opposite ends of the vertical arm of the cross head of the frame.

5. The combination with a frame having a vertical extension, of a driving shaft having one end thereof provided with a crank arm, a pedal shaft journaled on the frame in advance of the driving shaft and provided with a similar crank arm, a pitman connecting said crank arms, a cross head having intersecting horizontal and vertical arms, levers pivotally connected with the opposite ends of the horizontal arm of the cross head and pivotally connected with the pitman, links forming a pivotal connection between the opposite ends of the vertical arm of the cross head and the extension of the frame, and pedals operatively connected with the pedal shaft for actuating the crank arms to rotate the driving shaft.

In testimony that I claim the foregoing as my own, I have hereto affixed my signature in the presence of two witnesses.

WILLIAM W. SUTHERLAND.

Witnesses:
   C. C. SMITH,
   R. E. STEVENSON.